US012761380B2

(12) United States Patent
Ilan

(10) Patent No.: US 12,761,380 B2
(45) Date of Patent: Oct. 13, 2026

(54) METHOD FOR SENSING RADIATION

(71) Applicant: Applied Materials Israel Ltd., Rehovot (IL)

(72) Inventor: Elad Ilan, Rehovot (IL)

(73) Assignee: Applied Material Israel Ltd., Rehovot (IL)

( * ) Notice: Subject to any disclaimer, the term of this patent is extended or adjusted under 35 U.S.C. 154(b) by 113 days.

(21) Appl. No.: 19/014,089

(22) Filed: Jan. 8, 2025

(65) Prior Publication Data

US 2026/0194666 A1 Jul. 9, 2026

(51) Int. Cl.
*G01T 1/20* (2006.01)

(52) U.S. Cl.
CPC ................................ *G01T 1/20184* (2020.05)

(58) Field of Classification Search
CPC ................................................. G01T 1/20184
See application file for complete search history.

(56) References Cited

U.S. PATENT DOCUMENTS

2005/0285960 A1 12/2005 Purcell et al.
2016/0112665 A1 4/2016 Meynants et al.
2019/0280031 A1 9/2019 Oh
2022/0078362 A1 3/2022 Jung et al.
2022/0229194 A1* 7/2022 Chen .................. G01T 1/20184
2022/0365228 A1* 11/2022 Sato ........................ A61B 6/00
2023/0297158 A1 9/2023 Zha et al.

OTHER PUBLICATIONS

Solhusvik, et al., "A 1280x960 3.75um pixel CMOS imager with Triple Exposure HDR", Proc. IISW, Jun. 2009, pp. 344-347.
PCT/US2025/051680, "International Search Report and Written Opinion", Feb. 13, 2026, 8 pages.

* cited by examiner

*Primary Examiner* — Mark R Gaworecki
(74) *Attorney, Agent, or Firm* — Kilpatrick Townsend & Stockton LLP

(57) ABSTRACT

A radiation sensing device that includes (a) a readout circuit that includes a first readout capacitor and a second readout capacitor, and (b) a pixel that includes: (i) a radiation sensing element that is configured to convert radiation that impinges on the radiation sensing element to radiation indicative charge; (ii) a floating diffusion branch that includes a floating diffusion region, a floating diffusion reset switch, and a floating diffusion branch output circuit; (iii) a capacitor branch that includes a capacitor branch switch, a capacitor, a capacitor reset switch and a capacitor branch output circuit; wherein a capacitance of the capacitor exceeds a capacitance of the floating diffusion region; and (iv) an input transfer gate that is configured to couple the radiation sensing element to at least one of the capacitor branch and the floating diffusion branch.

20 Claims, 5 Drawing Sheets

320

350

METHOD FOR SENSING RADIATION

BACKGROUND OF THE INVENTION

Samples such as integrated circuits are evaluated by using optical tools such the ENLIGHT™ of APPLIED MATERIALS™ Inc. of Santa Clara, California.

An optical tool illuminates a sample with radiation, and radiation reflected or scattered from the sample is detected by arrays of sensing elements.

It has been found that the intensity of detected radiation signals may span over a very wide range.

The detection is made in noisy surroundings, and there is a need to be able to sense detected radiation while taking into account the noisy surroundings, especially as the noise is unpredictable and may rapidly change.

There is a growing need to provide an efficient radiation detection circuit that will accurately detect radiation over a wide dynamic range.

BRIEF SUMMARY OF THE INVENTION

According to an embodiment there is provided a radiation sensing device that includes a readout circuit that includes a first readout capacitor and a second readout capacitor and a pixel.

According to an embodiment, the pixel includes:

a. A radiation sensing element that is configured to convert radiation that impinges on the radiation sensing element to radiation indicative charge.
b. A floating diffusion branch that includes a floating diffusion region, a floating diffusion reset switch, and a floating diffusion branch output circuit.
c. A capacitor branch that includes a capacitor branch switch, a capacitor, a capacitor reset switch and a capacitor branch output circuit. The capacitance of the capacitor exceeds a capacitance of the floating diffusion region.
d. An input transfer gate that is configured to couple the radiation sensing element to at least one of the capacitor branch and the floating diffusion branch;
e. a readout circuit that includes a first capacitor and a second capacitor;

According to an embodiment, the radiation sensing device is configured to:

a. Utilize the at least the first readout capacitor and the second readout capacitor in association with a pair of read operations related to the floating diffusion region, to provide a floating diffusion radiation related signal;
b. Determine, based on the floating diffusion radiation related signal and a floating diffusion region capacitance parameter, whether to read the capacitor; and
c. When it is determined to read the capacitor, utilize the at least the first readout capacitor and the second readout capacitor in association with a pair of read operations related to the capacitor, to provide a capacitor radiation related signal.

According to an embodiment, there is provided a method for radiation sensing, the method includes:

a. Providing a floating diffusion radiation related signal by utilizing at least a first readout capacitor of a readout circuit and a second readout capacitor of the readout circuit in association with a pair of read operations related to a floating diffusion region of a pixel, to provide a floating diffusion radiation related signal.

b. Determining, based on the floating diffusion radiation related signal and a floating diffusion region capacitance parameter, whether to read a capacitor of the pixel.
c. When it is determined to read the capacitor, provide a capacitor radiation related signal by utilizing at least the first readout capacitor and the second readout capacitor in association with a pair of read operations related to the capacitor.

According to an embodiment, the pixel further includes a radiation sensing element that is configured to convert radiation that impinges on the radiation sensing element to a radiation indicative charge; wherein the floating diffusion region belongs to a floating diffusion branch that further includes a floating diffusion reset switch, and a floating diffusion branch output circuit; wherein the capacitor belongs to a capacitor branch that further includes a capacitor branch switch, a capacitor reset switch and a capacitor branch output circuit; wherein a capacitance of the capacitor exceeds a capacitance of the floating diffusion region; wherein the floating diffusion branch and the capacitor branch are preceded by an input transfer gate that is configured to couple the radiation sensing element to at least one of the capacitor branch and the floating diffusion branch.

BRIEF DESCRIPTION OF THE DRAWINGS

The subject matter regarded as the invention is particularly pointed out and distinctly claimed in the concluding portion of the specification. The invention, however, both as to organization and method of operation, together with specimen s, features, and advantages thereof, may best be understood by reference to the following detailed description when read with the accompanying drawings in which:

Figure 1:
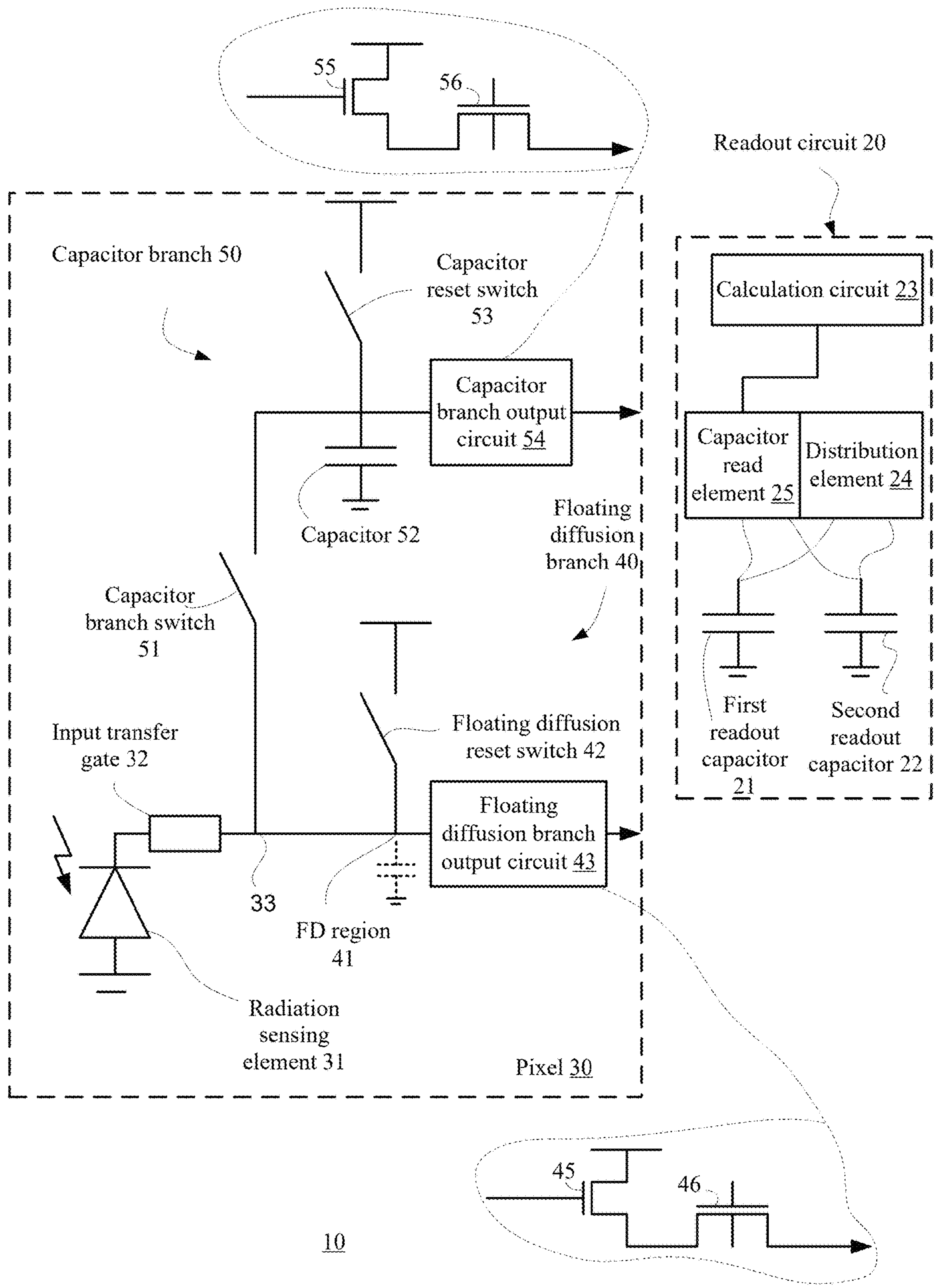
FIG. 1 illustrates an example of a radiation sensing device.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

According to an embodiment there is provided a radiation sensing device and a radiation sensing method that provide highly accurate radiation sensing using fewer components.

According to an embodiment, there is provided a radiation sensing device that includes a radiation sensing element that is configured to convert radiation that impinges on the radiation sensing element to radiation indicative charge. The radiation sensing device uses a floating diffusion branch that includes a floating diffusion region and a capacitor branch that include a capacitor. The capacitance of the capacitor exceeds the capacitance of the floating diffusion region. The reading of the floating diffusion region is associated with lower noise levels than the reading of the capacitor.

The floating diffusion region exhibits a floating diffusion region capacitance parameter that is indicative of a maximal charge limit of the floating diffusion region.

The floating diffusion region is configured to store the entire radiation indicative charge related to a low intensity radiation signal. When a low intensity radiation signal is sensed by the radiations sensing device, only the floating diffusion region is read, to provide a reading process that exhibits a low noise level.

When a high intensity radiation signal is sensed, the floating diffusion region is configured to store only a part of the radiation indicative charge related to the high intensity radiation signal, and the capacitor is used to store a residual charge, the residual charge is above the maximal charge limit of the floating diffusion region. It should be noted that the residual charge may exceed and even well exceed (for example by a factor of 10, 100, 1000, and more) the part of the radiation indicative charge stored at the RD region.

According to an embodiment, in order to provide an accurate measurement of the charge stored in the floating diffusion region due to the radiation there is a need to execute a pair of floating diffusion region read operations: one before coupling the radiation sensing element to the floating diffusion region and another after coupling the radiation sensing element.

The pair of floating diffusion region read operations uses a first readout capacitor and a second readout capacitor of a readout circuit.

According to an embodiment, in order to provide an accurate measurement of the charge stored in the capacitor due to the radiation there is a need to execute a pair of capacitor read operations: one before coupling the radiation sensing element to the capacitor and another after coupling the capacitor sensing element.

Having a separate floating diffusion region branch and a separate capacitor branch facilitates a reuse the first readout capacitor and the second readout capacitor for the pair of capacitor read operations.

Reusing the first readout capacitor and the second readout capacitor reduces the size of the readout circuit and reduces the connectivity between the pixels and the readout circuit—for example by reducing the number of connectors between each pixel and the readout circuit and, additionally or alternatively, by reducing the size and complexity of a distributing element (denoted 24 in FIG. 1) of the readout circuit that directs the signals to the different readout capacitors.

According to an embodiment, the entire capacitor branch or at least one or more components of the capacitor branch are shared between multiple pixels—further reducing the size of the pixels.

FIG. 1 illustrates an example of a radiation sensing device 10.

According to an embodiment, the radiation sensing device 10 includes:

a. A readout circuit 20 that includes a first readout capacitor 21, a second readout capacitor 22, calculation circuit 23, capacitor read element 25 and distributing element 24.

b. A pixel 30 that includes a radiation sensing element 31 that is configured to convert radiation that impinges on the radiation sensing element to radiation indicative charge, an input transfer gate 32, a floating diffusion branch 40, and a capacitor branch 50.

According to an embodiment, the floating diffusion branch 40 includes a floating diffusion region (denoted FD region) 41, a floating diffusion reset switch 42, and a floating diffusion branch output circuit 43. FIG. 1 illustrates the floating diffusion branch output circuit 43 as including a floating diffusion source follower transistor 45 followed by floating diffusion output transistor 46 that acts as a switch.

According to an embodiment, the capacitor branch 50 includes a capacitor branch switch 51, a capacitor 52, a capacitor reset switch 53 and a capacitor branch output circuit 54. FIG. 1 illustrates the capacitor branch output circuit 53 as including a capacitor source follower transistor 55 followed by capacitor output transistor 56 that acts as a switch.

The capacitance of the capacitor exceeds a capacitance of the floating diffusion region.

According to an embodiment, the input transfer gate 32 is configured to couple the radiation sensing element to an input node 33. The input node 33 is coupled to the floating diffusion branch and to the capacitor branch. The input transfer controls a potential barrier and allows charges to flow from the photodiode.

According to an embodiment, the radiation sensing device 10 is configured to:

(a) Utilize the at least the first readout capacitor and the second readout capacitor in association with a pair of read operations related to the floating diffusion region, to provide a floating diffusion radiation related signal.

(b) Determine, based on the floating diffusion radiation related signal and a floating diffusion region capacitance parameter, whether to read the capacitor. According to an embodiment, the floating diffusion region capacitance parameter is indicative of a maximal charge limit of the floating diffusion region. The radiation sensing device is configured to determine not to read the capacitor when the floating diffusion radiation related signal is indicative that the floating diffusion region did not reach the maximal charge limit.

(c) When it is determined to read the capacitor, utilize the at least first readout capacitor and the second readout capacitor in association with a pair of read operations related to the capacitor, to provide a capacitor radiation related signal.

According to an embodiment, the radiation sensing device includes one or more other pixels, and the entire capacitor branch or at least one or more components of the capacitor branch (such as the capacitor reset switch 53 and the capacitor branch output circuit 54) are shared between the pixel and the one or more other pixels. According to an embodiment, the capacitor is also shared. According to an embodiment the capacitor branch switch 51 is also shared.

According to an embodiment, the pixel 30 is configured to disconnect the capacitor branch switch 51, the floating diffusion reset switch 42, and the capacitor reset switch 53 before performing the pair of read operations related to the floating diffusion region.

According to an embodiment, the radiation sensing device is configured to utilize the at least the first readout capacitor and the second readout capacitor in association with the pair of read operations related to the floating diffusion region by:

a. Reading, by the pixel and the readout circuit, a first floating diffusion region signal, using the floating diffusion branch output circuit and the first readout capacitor.

b. Charging, by the pixel, using the input transfer gate, the floating diffusion region with the radiation indicative charge; and c. Reading, by the pixel and the readout circuit, a second floating diffusion region signal, using the floating diffusion branch output circuit and the second readout capacitor.

According to an embodiment, the readout circuit is further configured to calculate, using the calculation circuit 23, the floating diffusion radiation related signal by subtracting the first floating diffusion region signal from the second floating diffusion region signal.

According to an embodiment, the readout circuit is configured, when it is determined not to read the capacitor, to output an output signal that is indicative of the radiation, the output signal reflects the floating diffusion radiation related signal.

According to an embodiment, the radiation sensing device is configured to utilize the at least the first readout capacitor and the second readout capacitor in association with the pair of read operations related to the capacitor by:

a. Reading, by the pixel and the readout circuit, a first capacitor signal, using the capacitor branch output circuit and the first readout capacitor.
b. Charging, by the pixel, using the input transfer gate, the capacitor with the radiation indicative charge.
c. Reading, by the pixel and the readout circuit, a second capacitor signal, using the capacitor branch output circuit and the second readout capacitor.

According to an embodiment, the readout circuit is further configured to calculate, using a calculation circuit of the readout circuit, the capacitor radiation related signal by subtracting the first capacitor signal from the second capacitor signal.

According to an embodiment the pixel and the readout circuit are coupled using one or more conductors such as row lines and/or column lines and/or bit lines, and the like.

Figure 2:
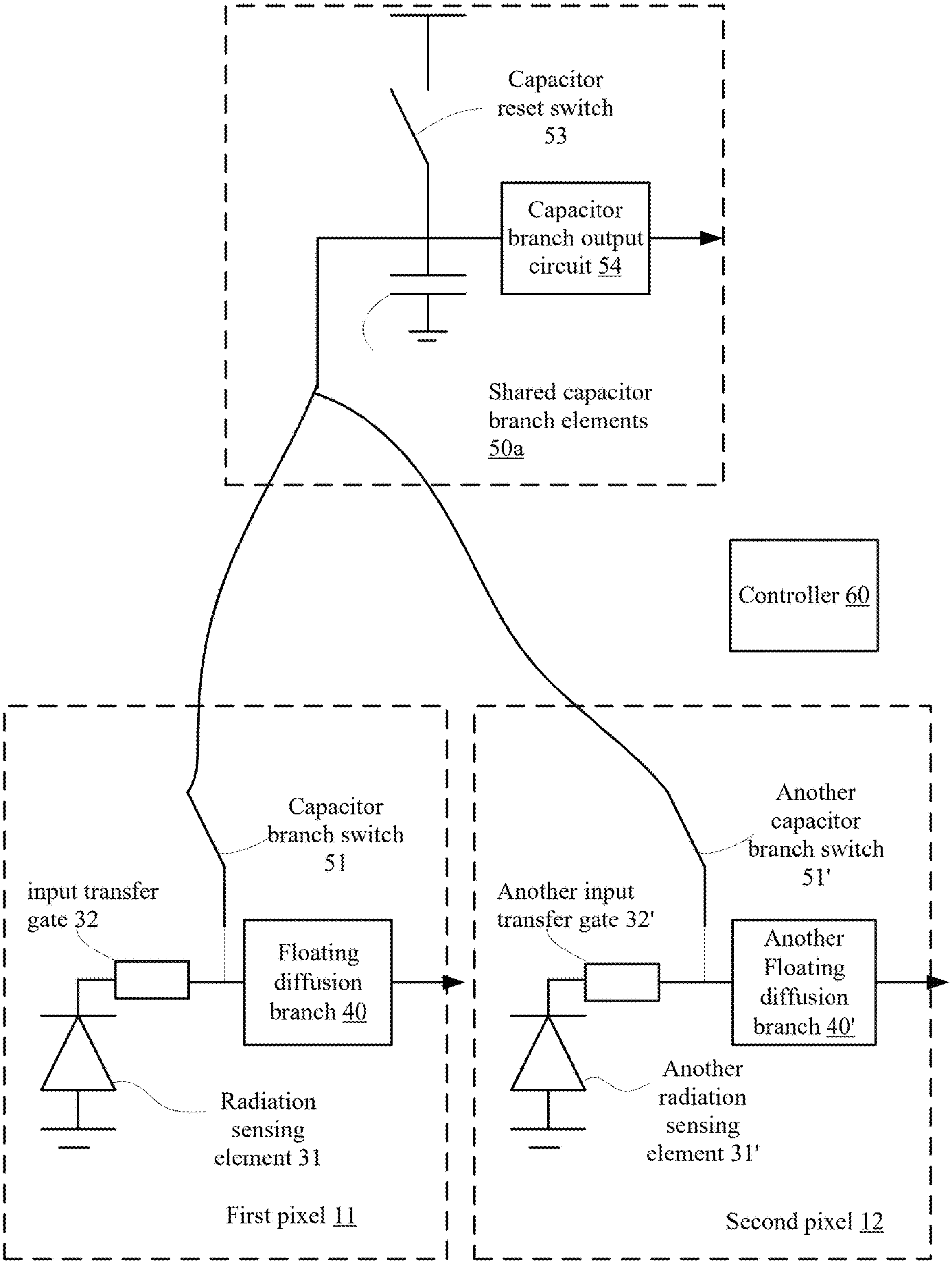
FIG. 2 illustrates an example of a first pixel and a second pixel that share an entire capacitor branch.

FIG. 2 illustrates an example of first pixel 11 and second pixel 12 share capacitor branch elements collectively denoted 50*a*.

The first pixel 11 is illustrated as including radiation sensing element 31, input transfer gate 32, capacitor branch switch 51, and floating diffusion branch 40.

The second pixel 12 is illustrated as including another radiation sensing element 31', another input transfer gate 32', another capacitor branch switch 51', and another floating diffusion branch 40'.

According to an embodiment each one of the first pixel and the second pixel are coupled to the readout circuit using one or more conductors such as row lines and/or column lines and/or bit lines, and the like.

FIG. 2 also illustrates a controller 60 that controls the supply of signals for operating the radiation sensing device. Controller 60 was not illustrated in FIG. 1 for simplicity of explanation.

According to an embodiment, controller 60 and each one of the first pixel and the second pixel are coupled using one or more command conductors.

Figure 3:
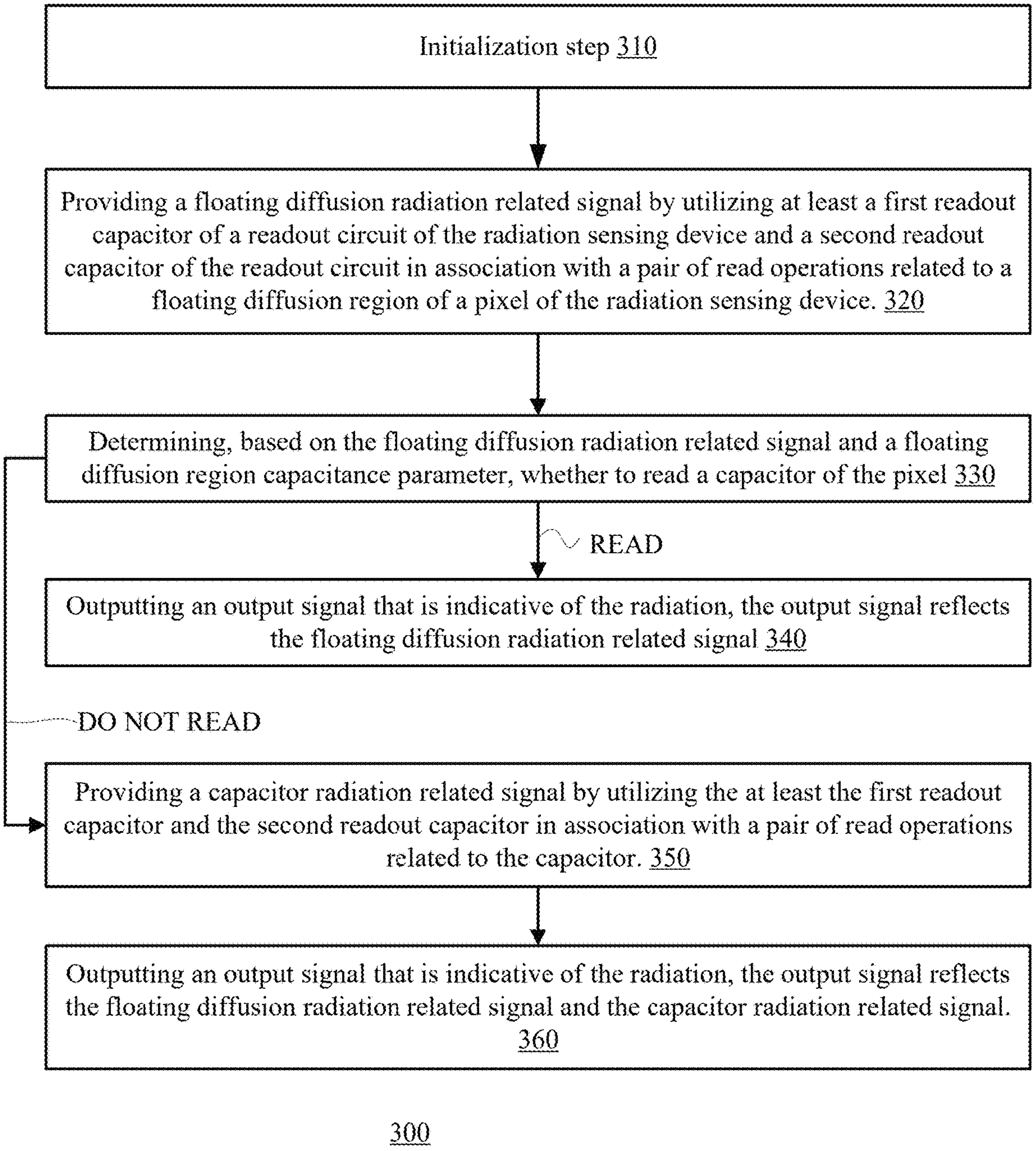
FIG. 3 illustrates an example of a method for radiation sensing.

FIG. 3 is an example of method 300 for radiation sensing.

According to an embodiment, method 300 includes operating any of the radiation sensing devices illustrated in the application. According to an embodiment, the radiation sensing device includes (a) a readout circuit that includes a first readout capacitor, a second readout capacitor and calculation circuit, and (b) a pixel that includes a radiation sensing element that is configured to convert radiation that impinges on the radiation sensing element to radiation indicative charge, an input transfer gate, a floating diffusion branch, and a capacitor branch. According to an embodiment, the floating diffusion branch includes a floating diffusion region, a floating diffusion reset switch, and a floating diffusion branch output circuit. According to an embodiment, the capacitor branch includes a capacitor branch switch, a capacitor, a capacitor reset switch and a capacitor branch output circuit. The capacitance of the capacitor exceeds a capacitance of the floating diffusion region. According to an embodiment, the input transfer gate is configured to couple the radiation sensing element to at least one of the capacitor branch and the floating diffusion branch.

According to an embodiment, method 300 starts with an initialization step 310. Step 310 include resetting at least a floating diffusion region of a radiation sensing device and a capacitor of the radiation sensing device.

According to an embodiment, step 310 includes disconnecting a capacitor branch switch of the radiation sensing device, a floating diffusion reset switch of the radiation sensing device, and a capacitor reset switch of the radiation sensing device.

According to an embodiment, step 310 is followed by step 320 of providing a floating diffusion radiation related signal by utilizing at least a first readout capacitor of a readout circuit of the radiation sensing device and a second readout capacitor of the readout circuit in association with a pair of read operations related to a floating diffusion region of a pixel of the radiation sensing device.

Figure 4:
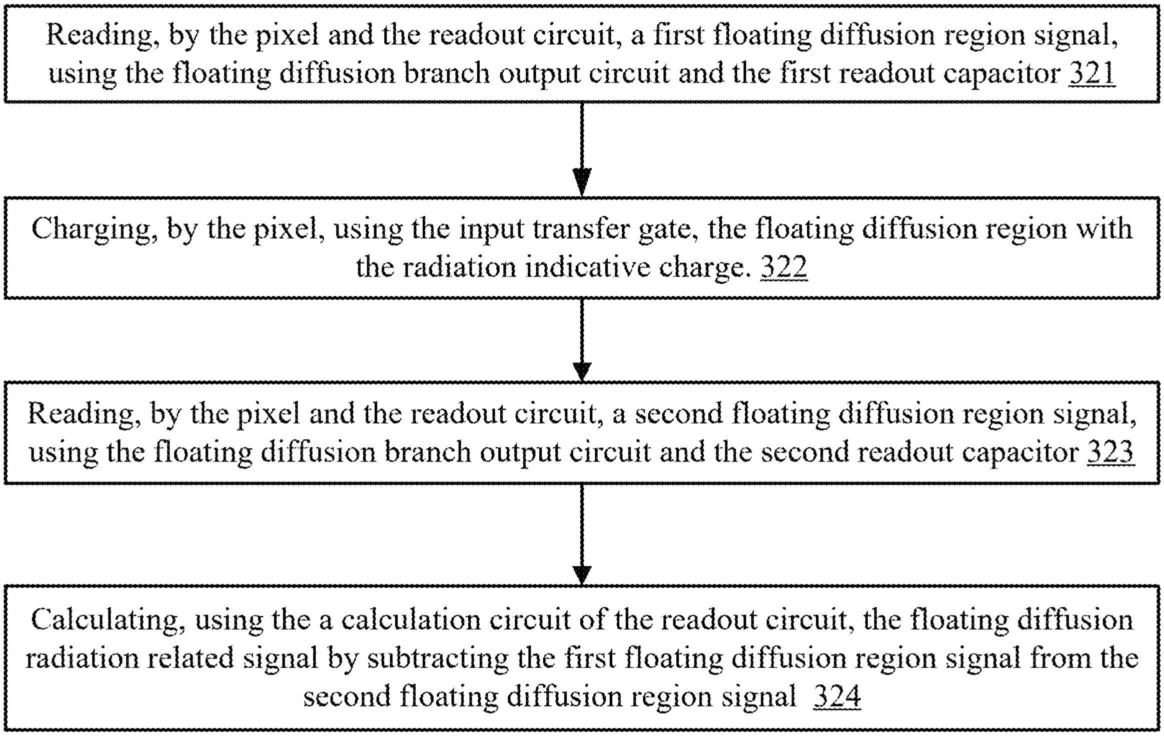
FIG. 4 illustrates an example of a step of the method of FIG. 3.

According to an embodiment, step 320 includes (see FIG. 4):

a. Step 321 of reading, by the pixel and the readout circuit, a first floating diffusion region signal, using the floating diffusion branch output circuit and the first readout capacitor.
b. Step 322 of charging, by the pixel, using the input transfer gate, the floating diffusion region with the radiation indicative charge. Because the capacitor branch is disconnected—the floating diffusion region is charged while the capacitor is not charged. The floating diffusion can be charged till it reaches its maximal charge limit. A low intensity radiation signal may only partially charge the floating diffusion region.
c. Step 323 of reading, by the pixel and the readout circuit, a second floating diffusion region signal, using the floating diffusion branch output circuit and the second readout capacitor.

According to an embodiment, step 320 also includes step 324 of calculating, using the calculation circuit, the floating diffusion radiation related signal by subtracting the first floating diffusion region signal from the second floating diffusion region signal.

According to an embodiment, step 320 is followed by step 330 of determining, based on the floating diffusion radiation related signal and a floating diffusion region capacitance parameter (such as but not limited to a threshold value), whether to read a capacitor of the pixel.

According to an embodiment, when determining not to read the capacitor, step 330 is followed by step 340 of outputting an output signal that is indicative of the radiation, the output signal reflects the floating diffusion radiation related signal.

According to an embodiment, when determining to read the capacitor, step 330 is followed by step 350 of providing a capacitor radiation related signal by utilizing the at least the first readout capacitor and the second readout capacitor in association with a pair of read operations related to the capacitor.

Figure 5:
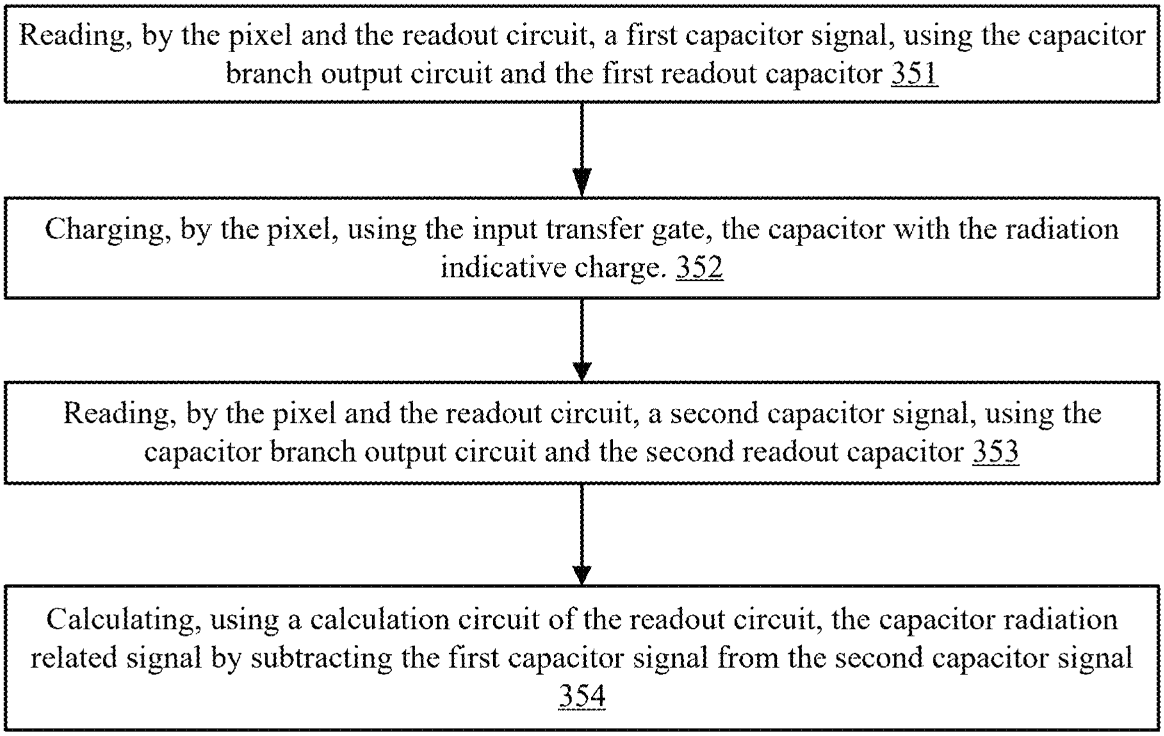
FIG. 5 illustrates an example of a step of the method of FIG. 3.

According to an embodiment, step 350 includes (see FIG. 5):

a. Step 351 of reading, by the pixel and the readout circuit, a first capacitor signal, using the capacitor branch output circuit and the first readout capacitor.
b. Step 352 of charging, by the pixel, using the input transfer gate, the capacitor with the radiation indicative charge.
c. Step 353 of reading, by the pixel and the readout circuit, a second capacitor signal, using the capacitor branch output circuit and the second readout capacitor.

According to an embodiment, step 350 further includes step 354 of subtracting the first capacitor signal from the second capacitor signal.

According to an embodiment, step 350 is followed by step 360 of outputting an output signal that is indicative of the radiation, the output signal reflects the floating diffusion radiation related signal and the capacitor radiation related signal. According to an embodiment, the output signal is a weighted sum of the floating diffusion radiation related signal and the capacitor radiation related signal.

According to an embodiment, the floating diffusion region capacitance parameter is indicative of a maximal charge limit of the floating diffusion region, and step 330 includes determining not to read the capacitor when the floating diffusion radiation related signal is indicative that the floating diffusion region did not reach the maximal charge limit. According to an embodiment, and in order to increase the certainty of the decision (to tolerate noise impacting the determining of the floating diffusion radiation related signal)—step 330 includes determining not to read the capacitor when the floating diffusion radiation related signal is indicative that the floating diffusion region did not reach, by at least a defined gap, the maximal charge limit. The defined gap range, for example between 1-20 percent (and the like) of the maximal charge limit.

According to an embodiment, the pair of read operations related to the floating diffusion region are associated with a lower noise that the pair of read operations related to the capacitor.

In the foregoing detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using optical and/or electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method.

Any reference in the specification to a system should be applied mutatis mutandis to a method that may be executed by the system.

The term and/or means additionally or alternatively. For example, A and/or B means only A, or only B or A and B.

In the foregoing specification, the embodiments of the disclosure have been described with reference to specific examples of embodiments. It will, however, be evident that various modifications and changes may be made therein without departing from the broader spirit and scope of the appended claims.

Any reference to the term "comprising" or "having" or "including" should be applied mutatis mutandis to "consisting" and additionally or alternatively should be applied mutatis mutandis to "consisting essentially of".

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above-described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A radiation sensing device, comprising:
a readout circuit comprising a first readout capacitor and a second readout capacitor;
a pixel comprising:
a radiation sensing element configured to convert radiation that impinges on the radiation sensing element to radiation indicative charge;
a floating diffusion branch comprising a floating diffusion region, a floating diffusion reset switch, and a floating diffusion branch output circuit;
a capacitor branch that comprises a capacitor branch switch, a third capacitor, a capacitor reset switch and a capacitor branch output circuit, wherein a capacitance of the capacitor exceeds a capacitance of the floating diffusion region; and
an input transfer gate configured to couple the radiation sensing element to at least one of the capacitor branch and the floating diffusion branch;
wherein the radiation sensing device is configured to:
(a) utilize at least the first readout capacitor and the second readout capacitor in association with a pair of read operations related to the floating diffusion region, to provide a floating diffusion radiation related signal;
(b) determine, based on the floating diffusion radiation related signal and a floating diffusion region capacitance parameter, whether to read the third capacitor; and
(c) when it is determined to read the third capacitor, utilize the at least the first readout capacitor and the second readout capacitor in association with a pair of read operations related to the third capacitor, to provide a capacitor radiation related signal.

2. The radiation sensing device according to claim 1, wherein the floating diffusion region capacitance parameter is indicative of a maximal charge limit of the floating diffusion region, wherein the radiation sensing device is configured to determine not to read the third capacitor when the floating diffusion radiation related signal is indicative that the floating diffusion region did not reach the maximal charge limit.

3. The radiation sensing device according to claim 1, wherein the pair of read operations related to the floating diffusion region are associated with a lower noise that the pair of read operations related to the third capacitor.

4. The radiation sensing device according to claim 1, further comprising one or more other pixels, wherein the capacitor branch is shared between the pixel and the one or more other pixels.

5. The radiation sensing device according to claim 1, wherein the pixel is configured to disconnect the capacitor branch switch, the floating diffusion reset switch, and the capacitor reset switch before performing the pair of read operations related to the floating diffusion region.

6. The radiation sensing device according to claim 1, wherein the radiation sensing device is configured to utilize the at least the first readout capacitor and the second readout capacitor in association with the pair of read operations related to the floating diffusion region by:
reading, by the pixel and the readout circuit, a first floating diffusion region signal, using the floating diffusion branch output circuit and the first readout capacitor;
charging, by the pixel, using the input transfer gate, the floating diffusion region with the radiation indicative charge; and
reading, by the pixel and the readout circuit, a second floating diffusion region signal, using the floating diffusion branch output circuit and the second readout capacitor.

7. The radiation sensing device according to claim 6, wherein the readout circuit is further configured to calculate, using a calculation circuit of the readout circuit, the floating diffusion radiation related signal by subtracting the first floating diffusion region signal from the second floating diffusion region signal.

8. The radiation sensing device according to claim 1, wherein the readout circuit is configured, when it is determined not to read the third capacitor, to output an output signal that is indicative of the radiation, the output signal reflects the floating diffusion radiation related signal.

9. The radiation sensing device according to claim 1, wherein the radiation sensing device is configured to utilize the at least the first readout capacitor and the second readout capacitor in association with the pair of read operations related to the third capacitor by:
reading, by the pixel and the readout circuit, a first capacitor signal, using the capacitor branch output circuit and the first readout capacitor;
charging, by the pixel, using the input transfer gate, the capacitor with the radiation indicative charge; and
reading, by the pixel and the readout circuit, a second capacitor signal, using the capacitor branch output circuit and the second readout capacitor.

10. The radiation sensing device according to claim 9, wherein the readout circuit is further configured to calculate, using a calculation circuit of the readout circuit, the capacitor radiation related signal by subtracting the first capacitor signal from the second capacitor signal.

11. A method for radiation sensing, the method comprising:
providing a floating diffusion radiation related signal by utilizing at least a first readout capacitor of a readout circuit and a second readout capacitor of the readout circuit in association with a pair of read operations related to a floating diffusion region of a pixel, to provide a floating diffusion radiation related signal;
determining, based on the floating diffusion radiation related signal and a floating diffusion region capacitance parameter, whether to read a capacitor of the pixel; and
when it is determined to read the capacitor, provide a capacitor radiation related signal by utilizing the at least the first readout capacitor and the second readout capacitor in association with a pair of read operations related to the capacitor;
wherein the pixel further comprises a radiation sensing element that is configured to convert radiation that impinges on the radiation sensing element to a radiation indicative charge; wherein the floating diffusion region belongs to a floating diffusion branch that further comprises a floating diffusion reset switch, and a floating diffusion branch output circuit; wherein the capacitor belongs to a capacitor branch that further comprises a capacitor branch switch, a capacitor reset switch and a capacitor branch output circuit; wherein a capacitance of the capacitor exceeds a capacitance of the floating diffusion region, wherein the floating diffusion branch and the capacitor branch are preceded by an input transfer gate that is configured to couple the radiation sensing element to at least one of the capacitor branch and the floating diffusion branch.

12. The method according to claim 11, wherein the floating diffusion region capacitance parameter is indicative of a maximal charge limit of the floating diffusion region, wherein the method comprises determining not to read the capacitor when the floating diffusion radiation related signal is indicative that the floating diffusion region did not reach the maximal charge limit.

13. The method according to claim 11, wherein the pair of read operations related to the floating diffusion region are associated with a lower noise that the pair of read operations related to the capacitor.

14. The method according to claim 11, comprising sharing the capacitor reset switch and the capacitor branch output circuit between multiple pixels.

15. The method according to claim 11, comprising disconnecting the capacitor branch switch, the floating diffusion reset switch, and the capacitor reset switch before performing the pair of read operations related to the floating diffusion region.

16. The method according to claim 11, wherein the providing of the floating diffusion radiation related signal comprises:

reading, by the pixel and the readout circuit, a first floating diffusion region signal, using the floating diffusion branch output circuit and the first readout capacitor;

charging, by the pixel, using the input transfer gate, the floating diffusion region with the radiation indicative charge; and reading, by the pixel and the readout circuit, a second floating diffusion region signal, using the floating diffusion branch output circuit and the second readout capacitor.

17. The method according to claim 16, wherein the providing of the floating diffusion radiation related signal further comprises calculating, using a calculation circuit of the readout circuit, the floating diffusion radiation related signal by subtracting the first floating diffusion region signal from the second floating diffusion region signal.

18. The method according to claim 11, comprising outputting an output signal that is indicative of the radiation, the output signal reflects the floating diffusion radiation related signal, when determining not to read the capacitor.

19. The method according to claim 11, wherein the providing of the capacitor radiation related signal comprises:

reading, by the pixel and the readout circuit, a first capacitor signal, using the capacitor branch output circuit and the first readout capacitor;

charging, by the pixel, using the input transfer gate, the capacitor with the radiation indicative charge; and reading, by the pixel and the readout circuit, a second capacitor signal, using the capacitor branch output circuit and the second readout capacitor.

20. The method according to claim 19, wherein the providing of the capacitor radiation related signal further comprises subtracting the first capacitor signal from the second capacitor signal.

* * * * *